United States Patent
Kovarik et al.

(10) Patent No.: US 6,727,679 B2
(45) Date of Patent: Apr. 27, 2004

(54) DC TO DC VOLTAGE CONVERTER HAVING A SWITCHING SIGNAL WITH ADJUSTABLE FREQUENCY AND AN ADJUSTABLE DUTY CYCLE

(75) Inventors: Illya Kovarik, Chicago, IL (US); Peter W. Neumann, Chicago, IL (US)

(73) Assignee: S-B Power Tool Corporation, Chicago, IL (US)

(*) Notice: Subject to any disclaimer, the term of this patent is extended or adjusted under 35 U.S.C. 154(b) by 79 days.

(21) Appl. No.: 10/096,045

(22) Filed: Mar. 12, 2002

(65) Prior Publication Data
US 2003/0173940 A1 Sep. 18, 2003

(51) Int. Cl.⁷ .............................. G05F 1/652; G05F 1/10
(52) U.S. Cl. ..................... 323/222; 323/224; 323/284
(58) Field of Search ................................. 323/222, 224, 323/282, 284

(56) References Cited

U.S. PATENT DOCUMENTS

| | | | |
|---|---|---|---|
| 3,619,753 A | * 11/1971 | Thompson | 388/830 |
| 3,665,502 A | 5/1972 | Means | 321/28 |
| 4,612,492 A | * 9/1986 | Burk | 320/103 |
| 5,656,876 A | 8/1997 | Radley et al. | 307/150 |
| 5,696,439 A | * 12/1997 | Presti et al. | 323/283 |
| 5,714,863 A | 2/1998 | Hwang et al. | 320/1 |
| 5,721,140 A | * 2/1998 | Speck | 436/16 |
| 5,929,597 A | 7/1999 | Pfeifer et al. | 328/107 |
| 5,929,614 A | * 7/1999 | Copple | 323/222 |
| 6,037,755 A | * 3/2000 | Mao et al. | 323/222 |
| 6,043,623 A | 3/2000 | McCary | 318/632 |
| 6,043,633 A | * 3/2000 | Lev et al. | 323/222 |
| 6,087,815 A | 7/2000 | Pfeifer et al. | 323/282 |
| 6,323,626 B1 | * 11/2001 | Raiser | 323/222 |
| 6,348,781 B1 | * 2/2002 | Midya et al. | 323/224 |
| 6,541,947 B1 | * 4/2003 | Dittmer et al. | 323/284 |

* cited by examiner

*Primary Examiner*—Bao Q. Vu
(74) *Attorney, Agent, or Firm*—Greer, Burns & Crain, Ltd.

(57) ABSTRACT

A DC—DC voltage converter that is capable of increasing as well as decreasing the voltage of a battery pack for application to a power tool or other load. The converter thereby enables different voltage batteries to be used with power tools that have motors that operate at different voltages. The voltage conversion is accomplished by using a relatively high speed switching circuit wherein the duty cycle of the switching circuitry varies the output voltage. An alternative embodiment utilizes feedback control circuitry to automatically adjust the duty cycle so that the speed of the motor, which is a function of the voltage applied to it, would be held generally constant.

22 Claims, 2 Drawing Sheets

DC TO DC VOLTAGE CONVERTER HAVING A SWITCHING SIGNAL WITH ADJUSTABLE FREQUENCY AND AN ADJUSTABLE DUTY CYCLE

The present invention generally relates to voltage converters and more particularly to DC to DC voltage converters that are used for power hand tools and the like which have motors that operate with DC voltage or which otherwise have DC voltage source requirements.

Direct current to direct current (DC—DC) voltage converters are certainly known in the prior art and voltage converters that convert the voltage levels upwardly or downwardly are also known. Those which convert the voltage upwardly are also known as boost converters and those which convert voltage downwardly are known as buck converters. In the art of cordless power tools which use DC motors or motors that are capable of being operated with either DC or AC power, such as motors that are presently known as universal motors, there is a desire to increase the performance of tools in terms of the torque that is generated as well as the longevity of operation. A common method to increase cordless power tool performance is to increase the system operating voltage, which in the past has been achieved by simply adding more battery cells to drive bigger motors. However, this solution creates an obvious dilemma in that more cells require more space and weigh more which results in the whole tool becoming bigger and clumsier. This is quite undesirable with respect to some types of tools such as the small rotary hand tools marketed under the Dremel brand made by the S-B Power Tool Company of Chicago, Ill., for example. Such tools are relatively small in that they can be easily held in one hand by a user and they accept various kinds of drill bits, grinding bits, saw blades, sanding disks and the like which are used in hobby work, woodworking, maintenance and repair work as well as other tasks. There is a need to provide an improved DC—DC voltage converter that can adapt different voltage batteries to different motor voltages, whether the conversion is either up or down from a fixed voltage battery or battery pack.

SUMMARY OF THE INVENTION

The present invention is directed to a DC—DC voltage converter that is capable of increasing as well as decreasing the voltage of a battery pack for application to a power tool or other load. The converter thereby enables different voltage batteries to be used with power tools that have motors that operate at different voltages. The converter can therefore also be characterized as a universal adapter circuit where either up or down voltage conversion can be employed depending upon the particular application that is being implemented. The simplicity of the circuitry of various embodiments of the present invention permits a relatively small tool to hold the battery as well as the converter and the motor. In the event that a removable battery pack is used, the simplicity of the converter is such that it can be housed in either the battery pack or in the tool itself. The design has a major advantage in that the converter itself is very compact and is therefore extremely well suited for use in small hand tools such as the Dremel hand tool mentioned above. It is also possible to have a converter located in a battery pack with the converter being available to operate in an up as well as down voltage conversion.

Another major advantage is that when used in a small DC cordless power tool such as the Dremel tool, a higher voltage motor can be used with the converter battery voltage to operate the higher voltage motor without the necessity of increasing the number of cells to obtain the necessary higher voltage.

The voltage conversion is accomplished by using a relatively high speed switching circuit wherein varying the duty cycle of the switching circuitry varies the output voltage. An alternative embodiment utilizes feedback control circuitry to automatically adjust the duty cycle so that the speed of the motor, which is a function of the voltage applied to it, would be held generally constant.

DETAILED DESCRIPTION OF THE EMBODIMENTS OF THE INVENTION

Figure 1:
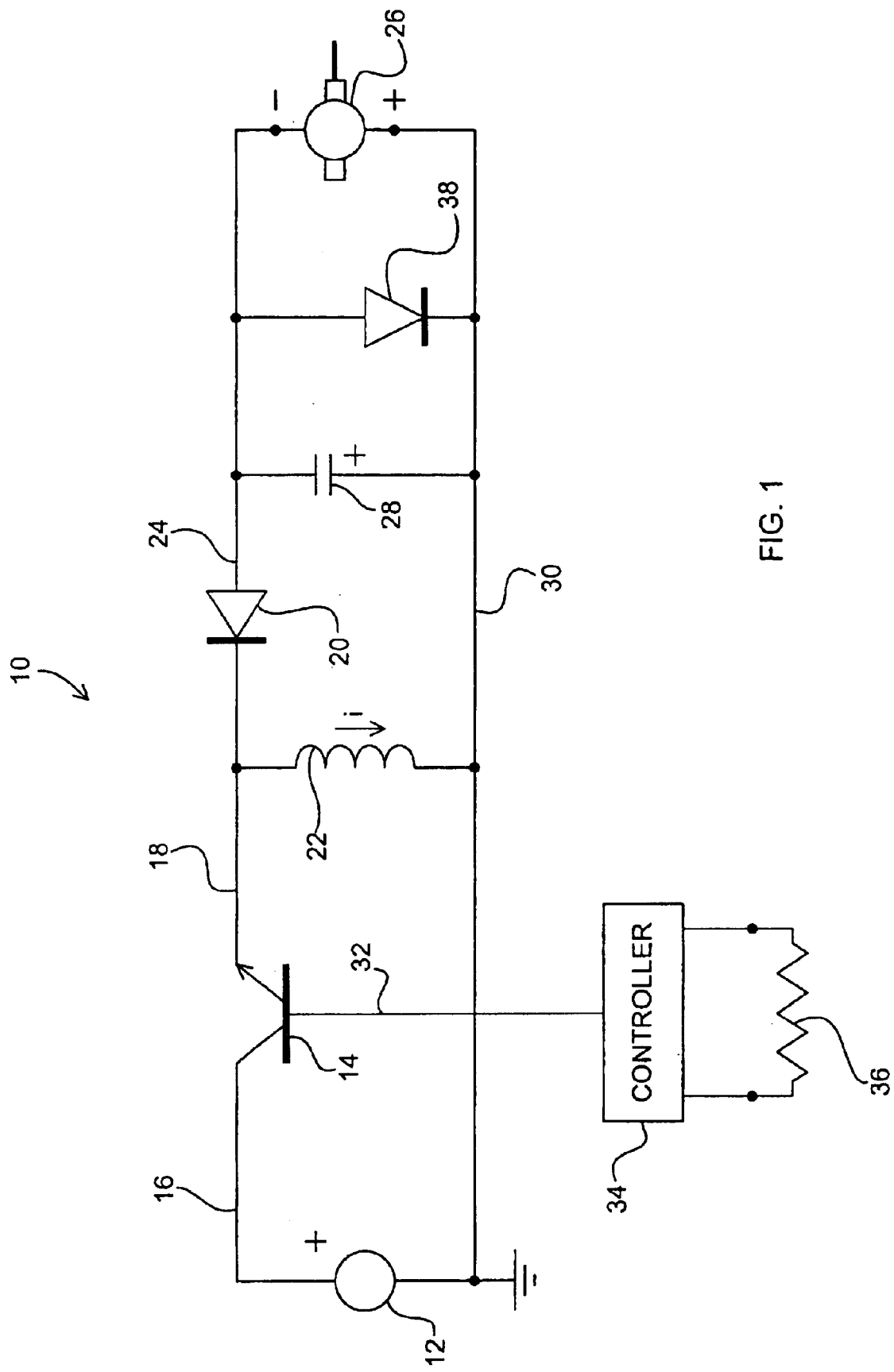
FIG. 1 is an electrical schematic diagram of a first embodiment of the present invention which is adapted to perform either up or down voltage conversion.

The first embodiment of the present invention is shown in FIG. 1 and is a universal DC—DC converter circuit for adapting different DC voltage operated motors to different system battery packs, for example. Since the DC motors operate in such a way that speed variation is a function of the voltage that is applied to them, the circuitry of FIG. 1 enables full range speed control to be implemented. In the event that the voltage is boosted, i.e., converted upwardly, the use of the converter circuit of FIG. 1 may result in the elimination of extra battery cells that would otherwise be required to provide the required voltage source to operate a particular motor. If extra battery cells are not needed, there is an obvious size and weight savings associated with such elimination. In the event that the circuit is used as a boost converter, the boosted output voltage is necessarily exchanged for an increased input current. However, the overall power in and out, minus some converted efficiency losses, are the same. This requires that the battery cells be able to handle the increased current draw which means that the fewer cells used should be of a higher amp-hour capacity to maintain adequate tool run-times.

Turning now to FIG. 1, the circuit indicated generally at 10, includes a battery 12 that is connected to the collector of a transistor switch 14 by line 16, with the transistor being a conventional bipolar junction transistor or a MOSFET. The emitter of the transistor 14 is connected to line 18 that extends to the cathode of a diode 20, as well as to one end of an inductor 22. The anode of the diode 20 is connected to line 24 that extends to one terminal of a DC motor 26 as well as to a capacitor 28. The capacitor is connected in parallel with the motor, with the other terminal of the capacitor being connected to line 30 that is connected to the other end of the inductor 22 as well as to ground. The base of the transistor 14 is connected to line 32 that is in turn connected to a controller 34 that operates to vary the duty cycle of the switching of the transistor 14. The controller 34 operates at a switching frequency that may be between 50 kHz and 200 kHz and beyond, for example, and preferably operates at approximately 100 kHz with the duty cycle, i.e., the ratio of the on-time to the total time of each cycle of operation being variable within the range of approximately 10% to approximately 90%. In this regard, the duty cycle may change depending upon what the magnitude of the required voltage is for the device to be driven relative to the magnitude of the battery input voltage. For example, if the input battery voltage is 18 VDC, and the converter is to drive a 24 VDC circular saw, the duty cycle may be approximately 60%. If the converter is to drive a 12 VDC drill, the duty cycle to produce such an output value may be approximately 40%.

To determine the voltage that a particular tool is designed to operate, various tools that may be designed for interoperability may have a code that is determined, with the code specifying the voltage that the tool in intended to operate at. This can be accomplished in a number of ways, including an electrical connection to a coding resistor 36 that can be provided in each tool and which is placed in circuit when the tool is connected to the converter circuit, with the value of the resistor specifying the desired operating voltage for the tool. The resistor 36 may be connected to the controller 34 which can apply a voltage to it and measure the current through it and determine the resistance. The resistance value can then be compared to a look up table that specifies the operating voltage as well as the correct duty cycle of operation to achieve the desired operating voltage.

During operation, when the controller 34 provides a signal to the base of the transistor 14 which is in excess of the emitter voltage, the transistor 14 is switched into conduction which causes a charging of the inductor 22 which establishes a current going through it. The controller then switches the transistor 14 off, but once there is current flowing through the inductor, it has a tendency to continue to flow which results in the diode 20 starting to conduct which will cause the capacitor 28 to charge. This occurs because the voltages at the output, i.e., at the motor 26 are actually inverted. The current through the inductor 22 will dissipate and the controller 34 will then initiate the next cycle which will recharge the inductor and back bias the diode 20 out of conduction. Any residual current flowing through the motor, as it would when the motor continues motion even though the converter has been switched off, will be shunted by a freewheeling diode 38. Depending upon the duty cycle, the voltage will either increase or decrease relative to the voltage of the battery 12, with a higher duty cycle operating to increase the voltage at the output which is applied to the motor 26

Figures 2, 2A:
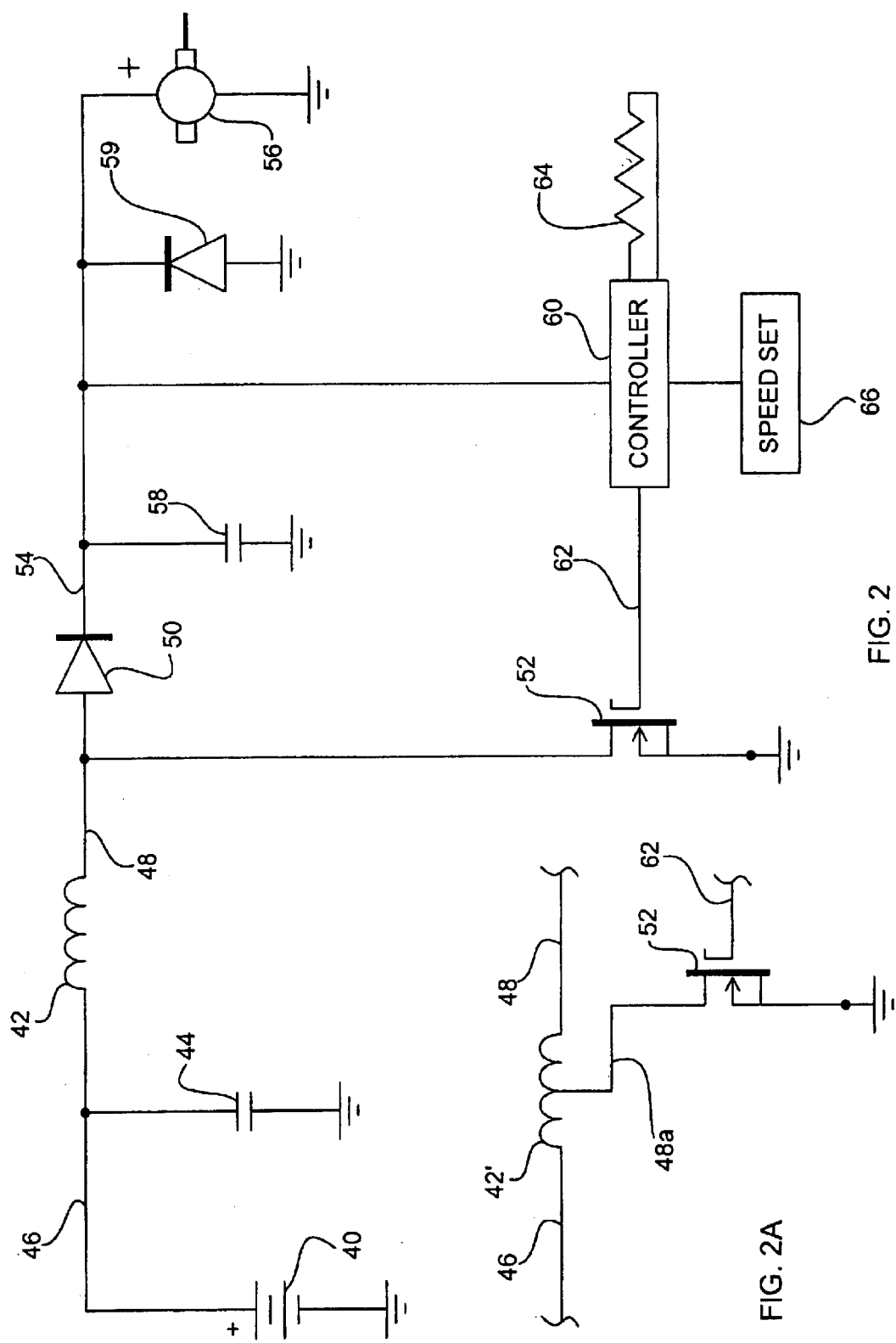
FIG. 2 is an electrical schematic diagram of a second embodiment of the present invention, which is adapted to perform voltage boosting or up conversion circuitry, and which also includes a feedback capability; and, FIG. 2A is a modification of the second embodiment shown in FIG. 2.

With regard to the embodiment illustrated in FIG. 2, a battery 40 is connected to an inductor 42 and capacitor 44 through line 46 with the other end of the inductor being connected to line 48 that is connected to the anode of a diode 50 as well as to a bipolar junction or field effect transistor 52. The cathode of the diode 50 is connected to line 54 that extends to a motor 56 as well as to a second capacitor 58, a diode 59 and a controller 60. The controller monitors the voltage on line 54 and provides an output on line 62 that extends to the gate of the FET 52.

As with the embodiment of FIG. 1, a coding resistor 64 that can be provided in each tool and which is placed in circuit when the tool is connected to the converter circuit, with the value of the resistor specifying the desired operating voltage for the tool. The resistor 64 is connected to the controller 60 which can apply a voltage to it and measure the current through it and determine the resistance. The resistance value can then be compared to a look up table that specifies the desired operating voltage as well as the correct duty cycle of operation to achieve the desired operating voltage which is preferably the maximum operating voltage.

A speed set adjuster 66 is operatively connected to the controller 60 for adjusting the duty cycle of the transistor 52. In this regard, since the controller 60 specifies the proper duty cycle to achieve the maximum speed of operation as a result of determining the proper operating voltage of the tool, the speed set adjuster 66 will be effective to reduce the duty cycle to reduce the speed of operation.

With regard to the operation of the embodiment shown in FIG. 2, the battery 40 supplies energy via line 46 and the input capacitor 44 in parallel with the battery serves to decouple the current spikes from the battery. The combination of the inductor 42, the transistor switch 52, the diode 50 and the capacitor 58 provide the voltage boosting action. When transistor 52 is switched on, the battery 40 is shorted to ground via the line 46, inductor 42, line 48 and transistor 52, and the current through the inductor 42 ramps up and energy will be stored in the inductor 42.

When the transistor 52 is turned off, the diode 50 will turn on and the current through the inductor 42 will decrease, delivering the stored energy in the inductor 42 to the output. The capacitor 58 will charge and the voltage at the output, due to inductive flyback, will be higher than the input. The motor is supported by the current from the inductor 42. A freewheeling diode 59 allows current to circulate if the motor continues to run, even when the current though inductor 42 has dissipated. By modulating the switching transistor 52 on and off at a very high rate, also preferably approximately 100 kHz although it may be within the range of approximately 50 kHz to approximately 200 kHz and beyond, the average voltage at the output is therefore maintained higher than the battery voltage 40. The controller 60 generates the signals that switch the transistor 52 on and off. The speed set adjuster 66 allows the user to adjust the duty cycle of the transistor 52 to vary the speed downwardly from its maximum speed. By virtue of the feedback signals on the line 54 extending to the controller 60, it is able to compare the voltage applied from line 54 with that set by the speed set adjuster 66 and to adjust the duty cycle and thereby maintaining a constant voltage output and therefore maintain the set speed of operation. The duty cycle will also be dependant upon the amount of voltage increase that is required for achieving the desired tool operating voltage relative to the input battery voltage. Increasing the voltage from approximately 18 VDC to about 24 volts may require a duty cycle of about 25%.

A modification of the circuitry of FIG. 2 can be made to achieve much larger increases in output voltage relative to the input battery voltage as is shown in FIG. 2A. This modification will permit increases such as providing an output voltage of 120 VDC from a battery voltage of 24 VDC, for example, or an output voltage of 12 VDC from a 3.6 VDC input battery voltage. To provide such large increases, the inductor 42 preferably has one or more intermediate taps such as line 48a that extends from such a tap to the transistor 52. If the number of windings left of the tap relative to those on the right of the tap are approximately the same ratio as the ratio of the increase in voltage provided at the output relative to the output, then the duty cycle can be within the range of about 50%, the advantage being reduced stress on the switching devices and reduced RFI noise. It should also be understood that multiple taps can be provided. The circuit of FIG. 2 could also be modified to merely add another inductor between the connection point of the vertical and horizontal lines 48 and the diode 50. The relative size of the two inductors would also provide a ratio similar to that described with respect to the inductor 42' and the circuit would function in a similar manner.

From the foregoing, it should be appreciated that a DC—DC voltage converter that is capable of increasing as well as decreasing the voltage of a battery pack the voltage thereof for application to a power tool or other load has been shown and described, which enables different voltage batteries to be used with power tools that have motors that operate at different voltages. The simplicity of the design results in a major advantage that the converter itself is very compact and is thereby extremely suitable for use in small hand tools such as the Dremel hand tool mentioned above. Another major advantage is that when used in a small DC cordless power tool such as the Dremel tool, a higher voltage motor can be used with the converter battery voltage to operate the higher voltage motor without the necessity of increasing the number of cells to obtain the necessary higher voltage.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A DC to DC voltage converter circuit for use with power tools having a motor operable with DC voltage power and at least one battery having positive and ground terminals for supplying power to the converter circuit at a predetermined voltage, the converter circuit providing power at one or more desired operating voltages and comprising:

a ground line connecting the battery ground terminal to the motor;

a capacitor connected in parallel with the motor;

a switching transistor having a first terminal connected to the battery positive terminal and a second terminal connected to one end of an inductor that has its other end connected to ground, and a switching control third terminal that can switch the transistor into and out of conduction responsive to switching signals being applied thereto;

a controller for generating and applying said switching signals to said third terminal, said switching signals having an adjustable frequency and an adjustable duty cycle of conduction and non-conduction within a predetermined range;

wherein said controller can provide switching signals that cause said converter circuit to supply power at desired operating voltages that are selectively above and below said predetermined voltage.

2. A DC to DC voltage converter circuit as defined in claim 1 further comprising a diode having an anode and a cathode, said anode being connected to the motor and the capacitor, and said cathode being connected to said one end of said inductor and to said second terminal of said switching transistor.

3. A DC to DC voltage converter circuit as defined in claim 1 wherein said switching transistor is a NPN transistor and said first terminal is the collector, the second terminal is the emitter and the third terminal is the base.

4. A DC to DC voltage converter circuit as defined in claim 1 wherein said controller can vary said duty cycle within the range of about 10 percent to about 90 percent.

5. A DC to DC voltage converter circuit as defined in claim 1 wherein said controller can generate switching signals at frequencies within the range of about 50 kHz to about 200 kHz.

6. A DC to DC voltage converter circuit as defined in claim 1 wherein each tool has coding means associated with it that indicates the desired DC operating voltage of the tool, said controller being operatively connected to the coding means when the tool is connected to the converter circuit and can determine the desired DC operating voltage of the tool and thereafter provide said switching signals to cause said converter circuit to supply power at the desired operating voltage.

7. A DC to DC voltage converter circuit as defined in claim 6 wherein said coding means comprises a coding resistor having a value that specifies a desired operating voltage.

8. A DC to DC voltage converter circuit for use with one or more power tools, each of which have a motor that can be driven by a particular DC drive voltage, the circuit being connectable to at least one battery having positive and ground terminals for supplying power to the converter circuit at a predetermined voltage, the converter circuit having an output for connection to the motor and being capable of providing power at its output at the particular drive voltage that is selectively above or below the predetermined voltage, said converter circuit comprising:

a switching transistor having a first terminal connected to the battery positive terminal, a second terminal connected to one end of an inductor and to the cathode of a diode, and a third terminal that can switch the transistor into and out of conduction responsive to switching signals being applied thereto;

a capacitor having one end connected to the anode of said diode and to a first terminal of the motor and its opposite end connected to a second terminal of the motor;

a ground line connecting the battery ground terminal to said second terminal of the motor;

a controller for generating switching signals having an adjustable frequency and an adjustable duty cycle of conduction and non-conduction and applying said switching signals to said third terminal, said within a predetermined range;

wherein said controller can provide switching signals that cause said converter circuit to selectively supply power at its output at drive voltages that are above and below said predetermined voltage as a function of the frequency and duty cycles generated.

9. A DC to DC voltage converter circuit as defined in claim 8 wherein said switching transistor is a NPN transistor and said first terminal is the collector, the second terminal is the emitter and the third terminal is the base.

10. A DC to DC voltage converter circuit as defined in claim 8 wherein said controller can vary said duty cycle within the range of about 10 percent to about 90 percent.

11. A DC to DC voltage converter circuit as defined in claim 8 wherein said controller can generate switching signals at frequencies within the range of about 50 kHz to about 200 kHz.

12. A DC to DC voltage converter circuit as defined in claim 8 wherein each tool has coding means associated with it that indicates the desired DC drive voltage of the tool, said controller being operatively connected to the coding means when the tool is connected to the converter circuit and can determine the desired DC drive voltage of the tool and thereafter provide said switching signals to cause said converter circuit to supply power at the desired drive voltage.

13. A DC to DC voltage converter circuit as defined in claim 12 wherein said coding means comprises a coding resistor having a value that specifies a desired drive voltage.

14. A DC to DC voltage converter circuit for use with power tools having a motor with first and second terminals, the motor being capable of being driven by DC power supplied at a desired operating voltage, the circuit being connectable to at least one battery having positive and ground terminals for supplying power thereto at a predetermined voltage, the converter circuit providing power at one or more desired operating voltages and comprising:

a first capacitor connected in parallel with the battery;

an inductor having a plurality of internal windings and two ends, one end of said inductor being connected to the positive terminal of the battery and to the first capacitor;

a second capacitor connected in parallel with the first and second terminals of the motor;

a diode having a first terminal connected to the other end of said inductor and a second terminal connected to the first terminal of the motor and to said second capacitor;

a switching transistor having a first terminal connected to either the other end of said inductor or an internal winding thereof and to the battery positive terminal and a second terminal connected to one end of an inductor that has its other end connected to ground, and a switching control third terminal that can switch the transistor into and out of conduction responsive to switching signals being applied thereto;

a ground line connecting the battery ground terminal to the second terminal of the motor, the second terminal of the switching transistor, and the first and second capacitors;

a controller for generating and applying said switching signals to said third terminal, said switching signals having a predetermined frequency and an adjustable duty cycle of conduction and non-conduction within a predetermined range;

wherein said controller can provide switching signals that cause said converter circuit to selectively supply power at desired operating voltages that are at or above said predetermined voltage.

15. A DC to DC voltage converter circuit as defined in claim 14 wherein said duty cycle can be varied within the range of about 10 percent to about 90 percent.

16. A DC to DC voltage converter circuit as defined in claim 14 wherein said switching signals have a frequency within the range of about 50 kHz to about 200 kHz.

17. A DC to DC voltage converter circuit as defined in claim 14 wherein said controller is operatively connected to monitor the voltage applied to the motor, said controller having an adjustable voltage setting control, said controller varying the duty cycle of said switching signal to thereby vary said operating voltage being applied to the motor for the purpose of maintaining said voltage setting at its set position.

18. A DC to DC voltage converter circuit as defined in claim 17 wherein said controller includes a line connected to said first terminal of the motor for monitoring the voltage applied thereto.

19. A DC to DC voltage converter circuit as defined in claim 14 wherein said first terminal of said diode is an anode and said second terminal is a cathode.

20. A DC to DC voltage converter circuit for use with one or more power tools each having a motor that can be driven by a desired operating DC voltage that may be different for different motors, the circuit being connectable to at least one battery having positive and ground terminals for supplying power to the converter circuit at a predetermined voltage, the converter circuit having an output for connection to the motor and being capable of providing power at a desired operating voltage that is selectively at or above the predetermined voltage, said converter circuit comprising:

a first capacitor connected in parallel with the battery;

inductor means having first and second ends and a plurality of windings, said first end being connected to the positive terminal of the battery and to the first capacitor;

a second capacitor connected in parallel with first and second terminals of the motor;

a diode having a cathode and an anode, said anode being connected to said second end of said inductor and said cathode being connected to the first terminal of the motor and to said second capacitor;

a switching transistor having a first terminal connected to one of said windings or said second end of said inductor and to the anode of said diode and a second terminal connected to ground, and a switching control third terminal that can switch the transistor into and out of conduction responsive to switching signals being applied thereto;

a ground line connecting the battery ground terminal to the second terminal of the motor, said second terminal of said switching transistor, and said first and second capacitors;

a controller for generating and applying said switching signals to said third terminal, said switching signals having an adjustable duty cycle of conduction and non-conduction within a predetermined range that causes said converter circuit to selectively supply power at voltages that are at or above said predetermined voltage;

said controller being operatively connected to monitor the voltage applied to the motor and having an adjustable voltage setting adjuster for establishing a set position, said controller varying the duty cycle of said switching signal to thereby vary said operating voltage being applied to the motor for the purpose of maintaining said voltage setting at its set position.

21. A DC to DC voltage converter circuit as defined in claim 20 wherein each tool has coding means associated with it that indicates the desired DC operating voltage of the tool, said controller being operatively connected to the coding means when the tool is connected to the converter circuit and can determine the desired DC operating voltage of the tool and thereafter provide said switching signals to cause said converter circuit to supply power at the desired operating voltage.

22. A DC to DC voltage converter circuit as defined in claim 21 wherein said coding means comprises a coding resistor having a value that specifies a desired operating voltage.

* * * * *